Jan. 31, 1967  MASAO SUGAYA  3,301,514
CLIPS FOR CONDUITS OR PIPES
Filed May 28, 1965  2 Sheets-Sheet 1
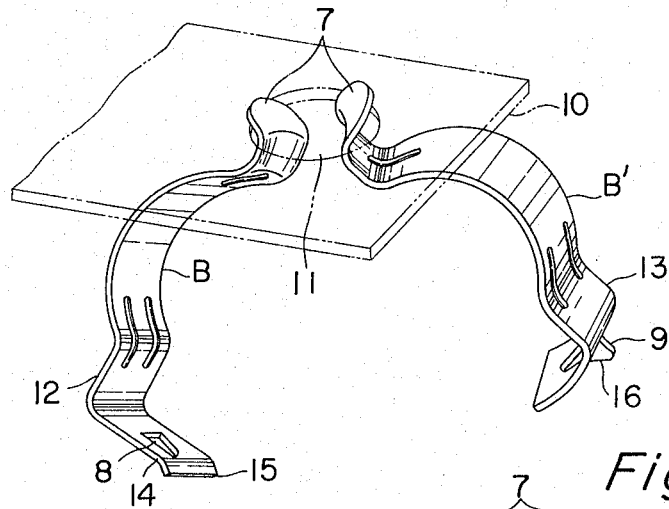
Fig. 1
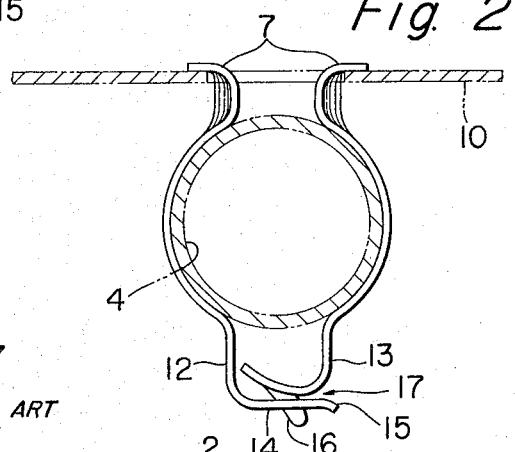
Fig. 2
Fig. 3
PRIOR ART
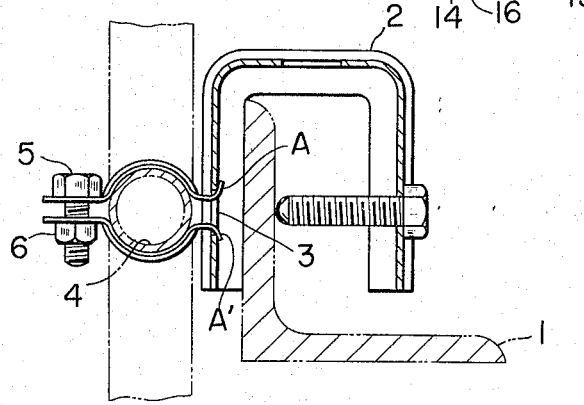
INVENTOR.
MASAO SUGAYA.
BY
ATTORNEY.

United States Patent Office 3,301,514
Patented Jan. 31, 1967

3,301,514
CLIPS FOR CONDUITS OR PIPES
Masao Sugaya, 1365 Higashi Komatsugawa 4-chome,
Edogawa-ku, Tokyo, Japan
Filed May 28, 1965, Ser. No. 459,733
Claims priority, application Japan, Sept. 30, 1964
(utility model), 39/77,174
3 Claims. (Cl. 248—73)

The present invention relates to improvements in clips for conduits or pipes, and more particularly to improved clips for conduits or pipes which may be employed in conjunction with beam clamps mounted on angles and/or other steel beams of buildings or other structures and which can firmly suspend conduits or pipes without the necessity for use of set bolts and nuts which are necessary in the prior art clips.

A prior art clip for a conduit or pipe comprises a pair of mating clip members formed of flexible metal strips each of which has a straight end portion having a bore for receiving a set bolt, an outwardly curved intermediate portion, and an outwardly and horizontally extending abutment end portion. These portions are integrally formed so as to form a continuous clip member. In other words, these clip members have the same, but symmetrical configuration. When the above-mentioned prior art clip is attached to a U-shaped beam clamp mounted on a steel beam or an angle of a building for the purpose of suspending a conduit by the clip in a predetermined relation to the steel beam, the outwardly and horizontally extending abutment end portions of both the clip members are firstly inserted into an opening formed in one leg of the U-shaped beam clamp the other leg of which also has an opening through which a set bolt extends, which bolt in turn secures the beam clamp to the building steel beam. Thereafter, a conduit is lengthwise inserted between the outwardly curved intermediate portions of the respective clip members and then a set bolt is passed through the aligned bores formed in the straight and parallel end portions of the respective clip members. Finally, nuts are screwed onto the opposite ends of the bolt thereby the conduit is firmly held by the clip members.

However, the above prior art clip has some disadvantages. For example, when a conduit is suspended by such a clip at a high place on a building, it is quite troublesome and inefficient to insert the bolt into the bores in the straight end portions of the clip members and to screw nuts onto the bolt by a wrench while supporting the weight of the conduit. Furthermore, there is the possibility of falling of the bolts and/or nuts which is hazardous to workers who work below the high place where the clip attaching operation is carried out.

In addition, when conduits or pipes of different outer diameters are to be installed on buildings, heretofore, it has been a common practice that different sizes of clips were employed which were exclusively designed to accommodate particular outer diameter conduits only respectively resulting in an economical disadvantage.

Accordingly, one object of the present invention is to provide improved clips for conduits or pipes which can effectively eliminate the defects inherent to the above-mentioned prior art conduit clip.

Another object of the present invention is to provide improved clips for conduits or pipes which are designed to easily accommodate conduits or pipes of various different outer diameters.

Another object of the present invention is to provide improved clips for conduits or pipes which do not necessitate the use of set bolts and nuts in firmly securing conduits or pipes therein.

A further object of the present invention is to provide improved clips for conduits or pipes which do not necessitate the use of set bolts and nuts for attaching the clips to beam clamps which are in turn mounted on angles or steel beams of buildings.

In a preferred form of clip for a conduit or pipe according to the present invention, such a clip comprises two wriggly clip members formed of flexible metal strips each of which has an outwardly curved center portion adapted to accommodate a conduit in cooperation with the symmetrically curved center portion of the other clip member, and an abutment end portion adapted to engage in an opening formed in a beam clamp which is mounted on a suitable support means in a building and to be retained by the clamp, the other end portion of one of said clip members being formed with a detention bore and the other end portion of the other clip member being formed with an integral locking piece adapted to engage in said detention bore, whereby a conduit may be firmly held by the clip without the necessity for use of set bolts and nuts.

The above and other objects, features and attendant advantages of the present invention will become apparent to those skilled in the art from a reading of the following detailed description of embodiments constructed according to the present invention referring to the accompanying drawings in which such embodiments are shown for illustration purpose.

In the drawings:

FIG. 1 is a perspective view of a preferred form of clip for a conduit or pipe embodying the present invention and which shows when the clip is inserted into an opening formed in a supporting means mounted on a part of a building, but the same is not yet accommodating a conduit therein;

FIG. 2 is a side elevational view of said clip showing when the clip has a conduit secured therein and is held in position by said supporting means;

FIG. 3 is a view of a prior art clip for a conduit or pipe showing when the clip which has a conduit secured therein is held in position by a U-shaped or channel shaped beam clamp which is mounted on an angle in a building;

Figure 4:
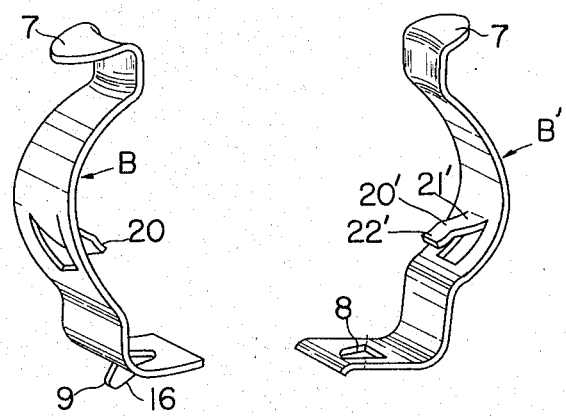
FIG. 4 is a perspective view of a modified form of clip for a conduit or pipe embodying the present invention.

Referring now to FIGS. 1 and 2, a preferred form of clip for a conduit or pipe embodying the present invention is illustrated. As shown, the clip comprises two wriggly flexible clip members formed of metallic strips B and B' and these clip members have the substantially same construction and configuration except for the lower end portions. As seen from FIG. 1, one clip member B is formed with a triangular shape stamped detention bore 8 in a horizontally extending extension 14 of the lower end portion 12 of the member B and the extension 14 extends inwardly and horizontally by a substantial distance. The other clip member B' is formed with a tongue piece or locking piece 9 at its lower end portion 13 which extends inwardly and upwardly at an angle by a distance shorter than that of the lower end extension 14 of the first clip member B. The tongue piece 9 is formed by cutting and upwardly bending at a point in the lower end portion 13 of the clip member B' by a known mechanical means. The size and position of the stamped detention bore 8 and tongue piece 9 are so selected that when the two clip members B and B' are put together so as to accommodate and firmly secure a conduit 4 therein, the tongue piece 9 may pass through the stamped bore 8. The respective clip members B and B' are further formed at their upper end portions with outwardly and horizontally extending abutments 7 and 7 respectively which are adapted to enter an opening 11 formed in a stationary supporting means 10 mounted on an angle or steel beam in a building and abut against the inner surface of the supporting means 10. In FIG. 1, the supporting means is shown as a plate member 10 which has a circular bore 11 through which the upper ends or abutments 7 of the clip members B and B' may pass through and are held in position thereby.

With the above construction, when the clip is employed for its designated purpose, that is, for suspending a conduit in a predetermined relation to a building the abutments 7 of both clip members B and B' are respectively passed through the circular bore 11 of the supporting plate 10 and then the members are pulled toward each other until they define a space slightly larger than the diameter of the conduit 4. Thereupon, the conduit 4 is lengthwise inserted into the space and the lower portions 12 and 13 of the clip members B and B' are then further pulled toward each other by means of pliers or pinchers (not shown) until the tongue piece 9 will enter the triangular detention bore 8 whereby the lower end extension 14 will be held by the tongue piece 9 against movement so that the conduit 4 can be firmly secured by the clip. The triangular shape of the stamped detention bore 8 is important in the clip by the present invention because the particular shape will allow the tongue piece 9 to easily enter and clear the stamped bore 8 even if the lowermost portions of both the clip members B and B' are not in an exact alignment. The end edge of the lower end extension 14 of the clip member B and the curved edge of the tongue piece 9 are respectively chamfered as indicated at 15 and 16 respectively so that these edges 15 and 16 may maintain a smooth slide contact until extension 14 is held in position by the tongue piece 9.

When it is desired to remove the conduit 4 from the clip, such removal can be easily performed by inserting the tip end of a suitable tool such as a screw driver in a clearance 17 defined by the opposite surfaces on the lowermost ends of the members and pushing the extension 14 downwardly until the tongue piece 9 will come out of the detention bore 8.

In FIG. 3, a typical prior art clip for a conduit or pipe is shown for the purpose of comparing the novel clips with the prior art clip.

As shown in this figure, the conventional clip comprises a pair of mating clip members formed of metallic strips A and A' each of which has a bored straight end or lower portion, an outwardly curved intermediate portion, and an outwardly bent upper end or abutment portion. These portions are integrally formed so as to form a continuous clip member. In other words, these clip members have the same, but symmetrical configuration. When this type of clip is employed for suspending a conduit 4 in a predetermined relation to a building, the outwardly bent abutment portions of the respective clip members A and A' are firstly passed through a circular opening formed in one leg of a U-shaped beam clamp 2 which is secured by a bolt and nut assembly to an angle 1 which is in turn mounted on a building (not shown). Thereafter, both clip members A and A' are pulled toward each other until the intermediate curved portions of the respective clip members A and A' will define a space slightly larger than the outer diameter of the conduit 4. Thereupon, conduit 4 is lengthwise inserted into the space between the curved intermediate portions of the clip members and then a set bolt 5 is passed through the aligned bores formed in the straight end portions of the clip members. Finally, nuts 6 are screwed onto the opposite ends of the set bolt 5 whereby the upper abutments of both the clip member are caused to contact flush to the inner surface of around the circular opening in the adjacent leg of the beam clamp 2 and accordingly, the conduit 4 is suspended by the clip in a predetermined relation to a portion of the building.

Figure 5:
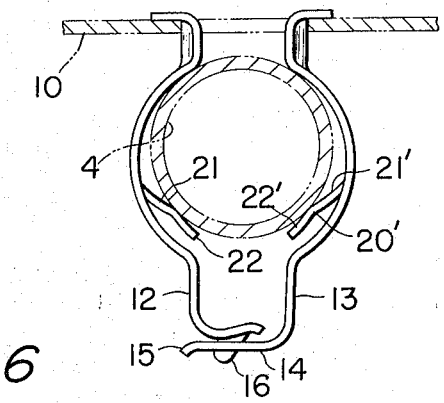
FIG. 5 is a side elevational view of the clip of FIG. 4 showing when the clip has a relatively small diameter conduit secured therein and is held in position by a supporting member mounted on a building.
Figure 6:
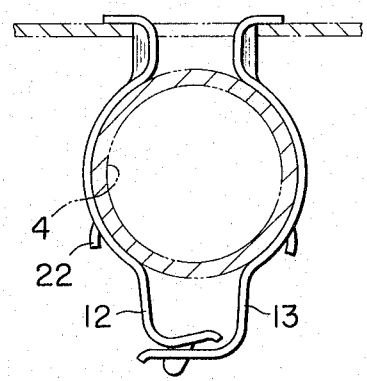
FIG. 6 is a side elevational view of the clip of FIG. 4 showing when the clip has a relatively large diameter conduit secured therein and is held in position by said supporting member.

Next, referring to FIGS. 4 to 6 inclusive in which a modified form of clip for a conduit or pipe embodying the present invention is shown. This modified form of clip comprises two clip members B and B' which are substantially the same as those of the first embodiment except that the clip members are respectively provided with tongue pieces or conduit holding pieces 20 and 20' in a position slightly below the middle point in the longitudinal direction thereof. As shown in FIG. 4, these tongue pieces 20 and 20' project inwardly by a short distance of the inner surfaces of the clip members in a position slightly below the middle point of the clip members in the longitudinal direction thereof and have curved upper surfaces 21 and 21' which are continuous to the curved inner surfaces of the clip member, and fore end portions 22 and 22' which are continuous to the curved surfaces 21 and 21' and have curvatures substantially corresponding to the outer peripheral configuration of the conduit 4 as shown in FIGS. 5 and 6.

Since these tongue pieces or conduit holding pieces 20 and 20' have a degree of resiliency, the fore end portions 22 and 22' serve to resiliently hold a relatively small diameter conduit in cooperation with the curvature at the upper surfaces 21 and 21' of the clip members as shown in FIG. 5. On the other hand, when a relatively large diameter conduit is to be secured by the clip, the upper surfaces 21 and 21' of the tongue pieces 20 and 20' are pushed back until they are aligned with the curved inner surfaces of the clip members and the fore end portions 22 and 22' project outwardly or backwardly of the clip members as shown in FIG. 6.

Therefore, it can be easily understood that the modified form of clip can be utilized to accommodate different diameters of conduits without the necessity of changes in the construction and arrangement thereof.

From the foregoing, it will be understood that since the novel clips have upper bent abutments which are adapted to engage in the anchoring openings of stationary metallic members or metallic plates which are secured to angles or steel beams in buildings, the clips can be easily used regardless of the direction in which conduits are installed. Furthermore, since conduits can be firmly secured in the clips without the necessity for use of set bolts and nuts and it is only necessary to insert the tongue pieces on the lower portions of the first clip members into the triangular bores on the lower portions of the second clip members, conduit suspending operation at high places can be made easier. Especially, elimination of the necessity for use of bolts and nuts can avoid the occurrence of hazards due to falling and loosening of bolts and/or nuts. When it is desired to move the conduits to other installation places or to dismantle them, the conduits can be easily taken out of the clips by the use of a screw driver.

From the foregoing description those skilled in the art will appreciate that numerous modifications and changes may be made of this invention without departing from its spirit. Therefore, I do not intend to limit the breadth of this invention to the specific embodiments illustrated and described. Rather, it is intended that the scope of this invention be limited to the appended claims and their equivalents.

What is claimed is:

1. A clip for a conduit or pipe comprising at least two flexible strip members, each of which has a center portion adapted to accommodate and hold a conduit in cooperation with the center portion of the other strip member, the center portions of the flexible strip members having an outwardly curved configuration so as to define a space for accommodating a conduit therebetween, each of the flexible strip members having a first bent abutment end with a transverse curvature substantially conforming to the curvature of an arcuate section in a circular opening of a support member, in which opening the abutment end is adapted to engage and to be held in position thereby, each of the flexible strip members having a second end with inwardly bent extensions adapted to lie one above the other when a conduit is accommodated between the strip members, the extension on the second end of one of the flexible strip members extending inward and horizontally and having a detention bore formed therein, the extension in the second end of the other of the flexible strip members extending inwardly and upwardly in a small arcuate form and having a locking piece formed therein adapted to engage in said detention bore, whereby when a conduit is accommodated between the strip members, the inner surface of said horizontally extending extention and the outer surface of said arcuately bent extension face each other and accordingly, said locking piece will engage in said detention bore.

2. A clip for a conduit or pipe according to claim 1 in which additional holding pieces are further provided on said curved center portions of the respective flexible strip members for accommodating and firmly holding a relatively small diameter conduit.

3. A clip for a conduit or pipe according to claim 2, in which said additional holding pieces are provided on the inner surfaces of said curved center portions of the flexible strip members and project inwardly of said inner surfaces.

References Cited by the Examiner

UNITED STATES PATENTS

| Re. 22,846 | 2/1947 | Morehouse | 248—74 |
| 1,426,325 | 11/1917 | Rohmer | 248—74 |
| 1,527,346 | 2/1925 | Brady | 248—74 |
| 1,837,259 | 12/1931 | Fitzpatrick | 248—74 |
| 1,967,075 | 7/1934 | Barthelemy | 248—74 |
| 2,179,406 | 11/1939 | Fitzpatrick | 248—68 |
| 2,397,279 | 3/1946 | Le Vesconte | 248—74 |
| 2,470,814 | 5/1949 | Hain | 248—68 |
| 2,535,427 | 12/1950 | Kindorf | 248—68 |

FOREIGN PATENTS

| 518,204 | 3/1953 | Belgium. |
| 1,364,768 | 5/1964 | France. |
| 462,115 | 7/1928 | Germany. |

CLAUDE A. LE ROY, *Primary Examiner.*